United States Patent
Ko

(10) Patent No.: US 6,282,644 B1
(45) Date of Patent: Aug. 28, 2001

(54) APPARATUS AND METHOD FOR STORING BIOS DATA OF COMPUTER SYSTEM

(75) Inventor: Jin-Suk Ko, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/227,159

(22) Filed: Jan. 8, 1999

(30) Foreign Application Priority Data

Jan. 8, 1998 (KR) .................................................... 98/253

(51) Int. Cl.⁷ .................................................. G06F 9/445
(52) U.S. Cl. ............................................................ 713/2
(58) Field of Search ....................................... 713/2

(56) References Cited

U.S. PATENT DOCUMENTS

| | | | |
|---|---|---|---|
| 5,603,011 | * 2/1997 | Piazza | 713/2 X |
| 5,835,761 | * 11/1998 | Ishii et al. | 713/2 X |
| 5,836,013 | * 11/1998 | Greene et al. | 713/2 |
| 5,951,685 | * 9/1999 | Stancil | 713/2 |

* cited by examiner

Primary Examiner—Thomas M. Heckler

(57) ABSTRACT

An apparatus and a method for storing a BIOS data of a computer system are disclosed. The apparatus includes a first storing apparatus for performing a function as a memory and a function as a storing apparatus for storing a BIOS data therein, a second storing apparatus in which a BIOS data stored in the first storing apparatus is copied and stored therein, a CPU(Central Processing Unit) for accessing a BIOS data stored in the first storing apparatus and driving a computer system when an electric power is supplied to the computer system, a main power controlling for supplying or blocking a main power, a controller for controlling each element of the system, and a system power unit for applying a system power to the first storing apparatus and the controller, respectively, for thereby significantly decreasing the fabrication cost of the system by storing a BIOS data into a SDRAM used as a cache memory of the computer system.

34 Claims, 4 Drawing Sheets

APPARATUS AND METHOD FOR STORING BIOS DATA OF COMPUTER SYSTEM

BACKGROUND OF THE INVENTION

1. Field of the Invention

The present invention relates to an apparatus and a method for storing a BIOS(Basic Input/Output System) data of a computer system, and in particular to an improved apparatus and a method for storing a BIOS data of a computer which are capable of storing a BIOS data by setting a predetermined region in a SRAM(Static Random Access Memory) used as a cache memory without using a ROM(Read Only Memory) as a storing apparatus for storing a BIOS data.

2. Description of the Background Art

FIG. 1 is a block diagram illustrating the construction of a BIOS data storing apparatus for a conventional computer system which includes a ROM 1 storing a BIOS data therein, a main memory 2 in which a BIOS data stored in the ROM 1 is copied into a shadow region 2-1, a CPU(Central Processing Unit) 3 for driving a computer system by accessing the BIOS data stored in the ROM 1, a cache memory 4 for storing a part of a program therein for performing an instruction at a higher speed, and a controller 5 for controlling each element.

The operation of the BIOS data storing apparatus for a conventional computer system will be explained with reference to FIG. 2.

First, when an electric power is supplied to the computer system in S1, the CPU 3 accesses the BIOS data stored in the ROM 1 and boots the system for driving the computer system in S2.

Here, the BIOS data stored in the ROM 1 includes a POST(Power On Self Test) routine and a boot load routine. Therefore, when supplying the electric power to the computer system, the CPU 3 accesses the BIOS data stored in the ROM 1, namely, the POST and boot load routines for thereby checking the hardware installed and driving the computer system.

The BIOS data stored in the ROM 1 are copied into the shadow region 2-1 of the main memory 2 in S3.

At this time, only the read operation is available for protecting the BIOS data copied into the shadow region 2-1 by masking the shadow region 2-1 of the main memory 2 for preventing the write operation in S4.

Thereafter, if the BIOS data is needed, the CPU 3 accesses an instruction and data from the shadow region 2-1 of the main memory 2 for thereby performing the program in S5.

In the above described BIOS data storing apparatus for a computer system, when the electric power is supplied to the computer system, the BIOS data stored in the ROM 1 are accessed for thereby driving the computer system. The thusly accessed data are copied into the shadow region 2-1 of the main memory 2. When the BIOS data are needed, the data copied into the shadow region 2-1 are accessed for thereby performing a corresponding program. The ROM 1 is used for a very short time when the electric power is supplied to the computer system. For this, the fabrication cost of the system is increased due to an expensive ROM.

SUMMARY OF THE INVENTION

Accordingly, it is an object of the present invention to provide an apparatus and a method for storing a BIOS data of a computer which overcomes the aforementioned problems encountered in the conventional art.

It is another object of the present invention to provide an apparatus and a method for storing a BIOS data of a computer system which is capable of significantly decreasing the fabrication cost of the system by storing a BIOS data into a SDRAM used as a cache memory of the computer system.

To achieve the above objects, there is provided an apparatus for storing a BIOS data of a computer which includes a first storing means for performing a function as a memory and a function as a storing means for storing a BIOS data therein, a second storing means in which a BIOS data stored in the first storing means is copied and stored therein, a CPU(Central Processing Unit) for accessing a BIOS data stored in the first storing means and driving a computer system when an electric power is supplied to the computer system, a main power controlling for supplying or blocking a main power, a controller for controlling each element of the system, and a system power unit for applying a system power to the first storing apparatus and the controller, respectively.

To achieve the above objects, there is provided a method for storing a BIOS data of a computer according to an embodiment of the present invention which includes a first step in which the CPU accesses a BIOS data stored in a predetermined region of the first storing means and drives a computer system when an electric power is supplied to the computer system, a second step in which the BIOS data stored in a predetermined region of the first storing means is copied into a predetermined region of the second storing means, a third step in which the BIOS data stored in a predetermined region of the second storing means is copied into a predetermined region of the first storing means, a fourth step in which the main power controller turns off an electric power supplied to the computer system, a fifth step in which the system power unit supplies a system power to a predetermined region of the first storing means and a predetermined region of the controller.

To achieve the above objects, there is provided a method for storing a BIOS data of a computer according to another embodiment of the present invention which includes a first step in which a computer system is driven when an electric power is supplied to the computer system, a second step in which a BIOS data stored in a predetermined region of the first storing means is copied into a predetermined region of a second storing means, a third step in which a BIOS data stored in a predetermined region of the second storing means is copied into a predetermined region of the first storing means, a fifth step in which the power supplied to the computer system is turned off, and a sixth step in which a system power is supplied to a predetermined region of the second storing means and a third storing means.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
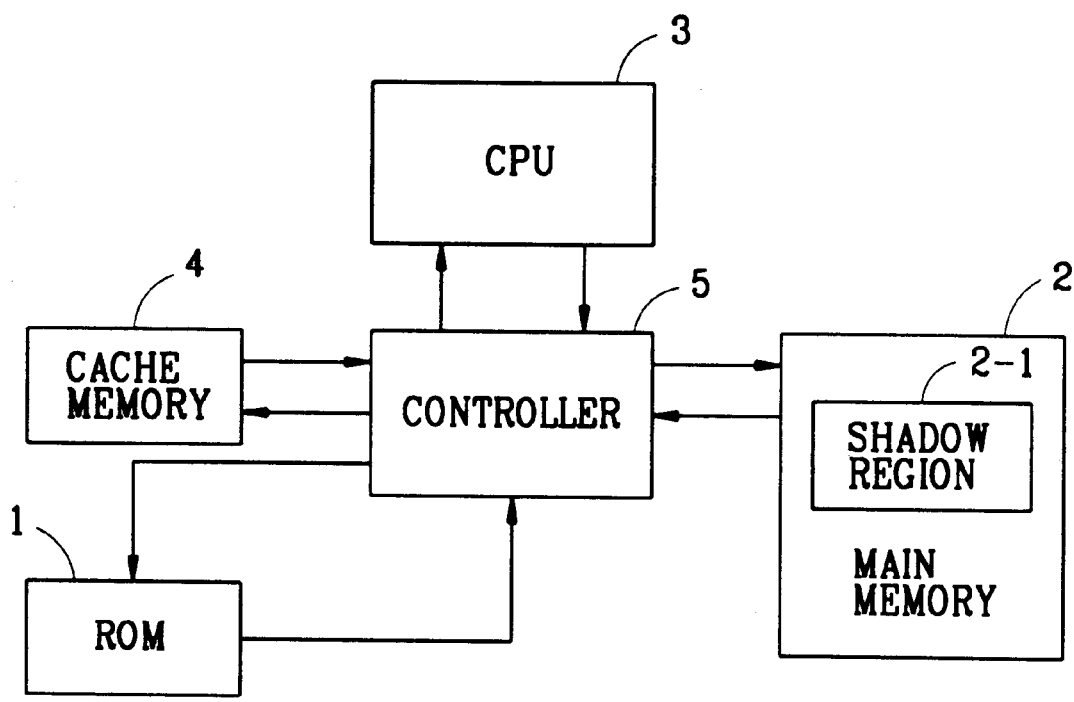
FIG. 1 is a block diagram illustrating the construction of a BIOS data storing apparatus for a conventional computer system.
Figure 2:
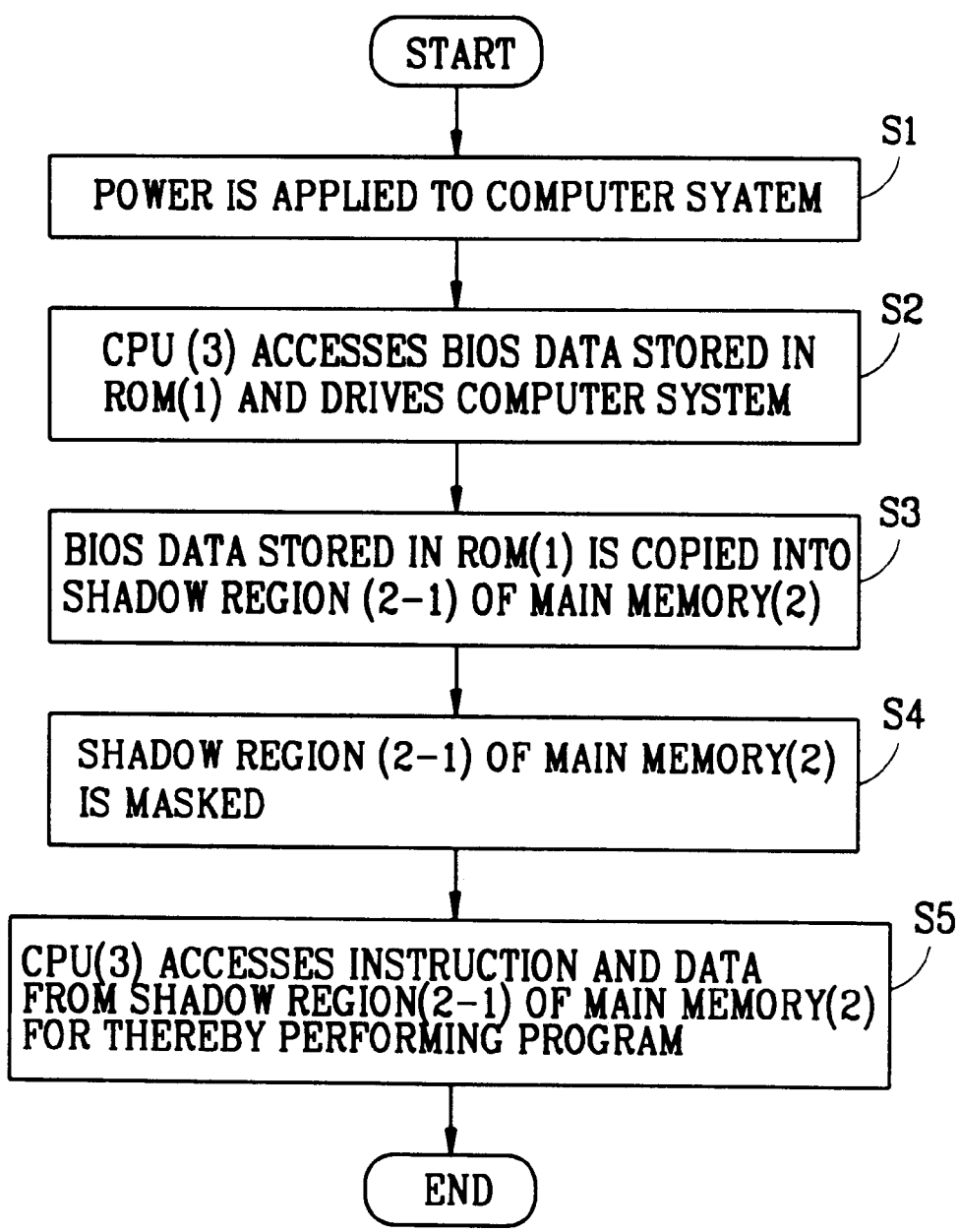
FIG. 2 is a flow chart of the conventional art.
Figure 3:
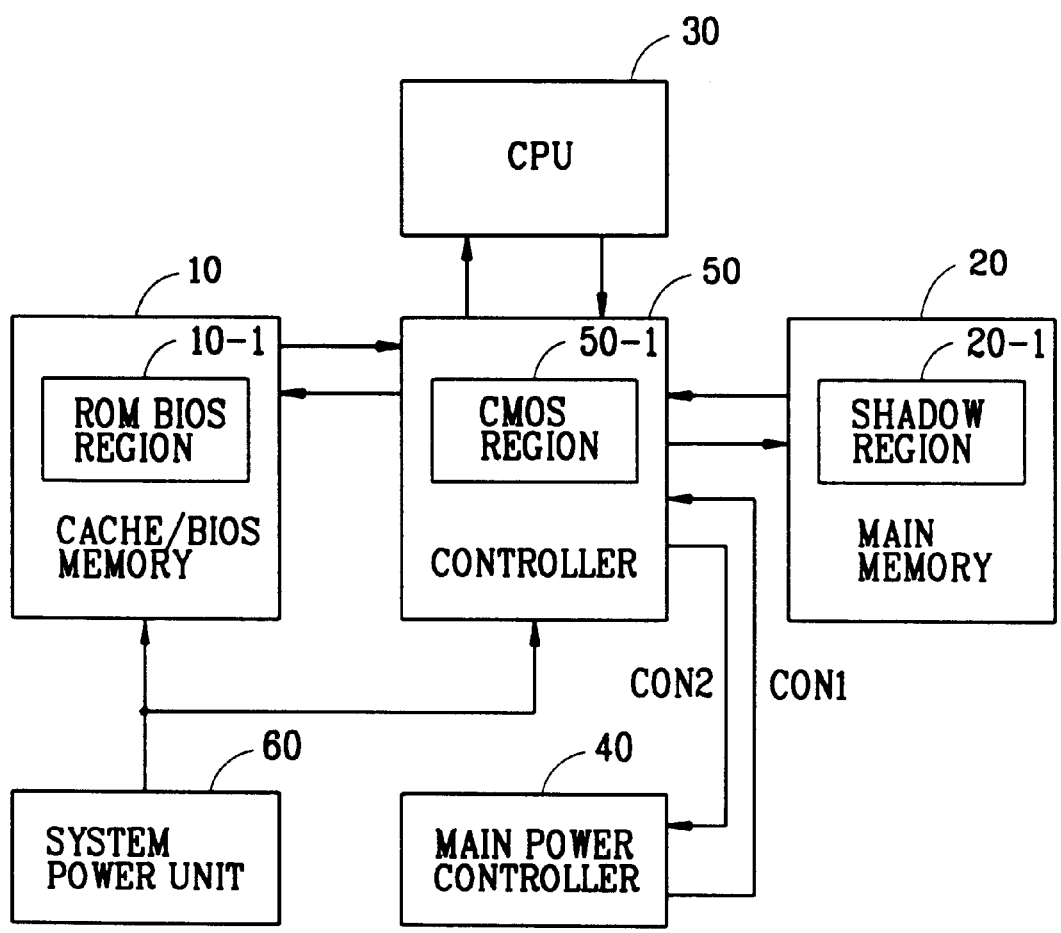
FIG. 3 is a block diagram illustrating the construction of a BIOS data storing apparatus for a computer system according to the present invention.

FIG. 3 is a block diagram illustrating a BIOS data storing apparatus for a computer system according to the present invention. As shown therein, the BIOS data storing apparatus includes a cache/BIOS memory 10 for storing a part of a program when performing the program and serving as a cache memory for implementing a high speed operation for an instruction and as a BIOS data storing apparatus for storing a BIOS data therein, a main memory 20 for copying a BIOS data stored in the cache/BIOS memory 10 and storing the same therein, a CPU(Central Processing Unit) 30 for accessing the BIOS data stored in the cache/BIOS memory 10 when an electric power is supplied to the computer system and driving the computer system, a main power controller 40 for supplying or blocking the main power, a controller 50 for controlling each element of the system, and a system power unit 60 for supplying a system power to the cache/BIOS memory 10 and the controller 40 for preventing the loss of the data stored.

The cache/BIOS memory 10 includes a ROM BIOS region 10-1 for storing the BIOS data therein. For example, if the SDRAM of 256 KB is used for the cache/BIOS memory 10, 128 KB is allocated to the ROM BIOS region 10-1.

The main memory 20 includes a shadow region 20-1 for copying the BIOS data stored in the ROM BIOS region 10-1 of the cache/BIOS memory 10 and storing the same therein.

The controller 50 includes a CMOS region 50-1 for storing a basic function therein for the case that the computer system is not booted up due to an error when copying the BIOS data into the cache/BIOS memory 10.

Figure 4:
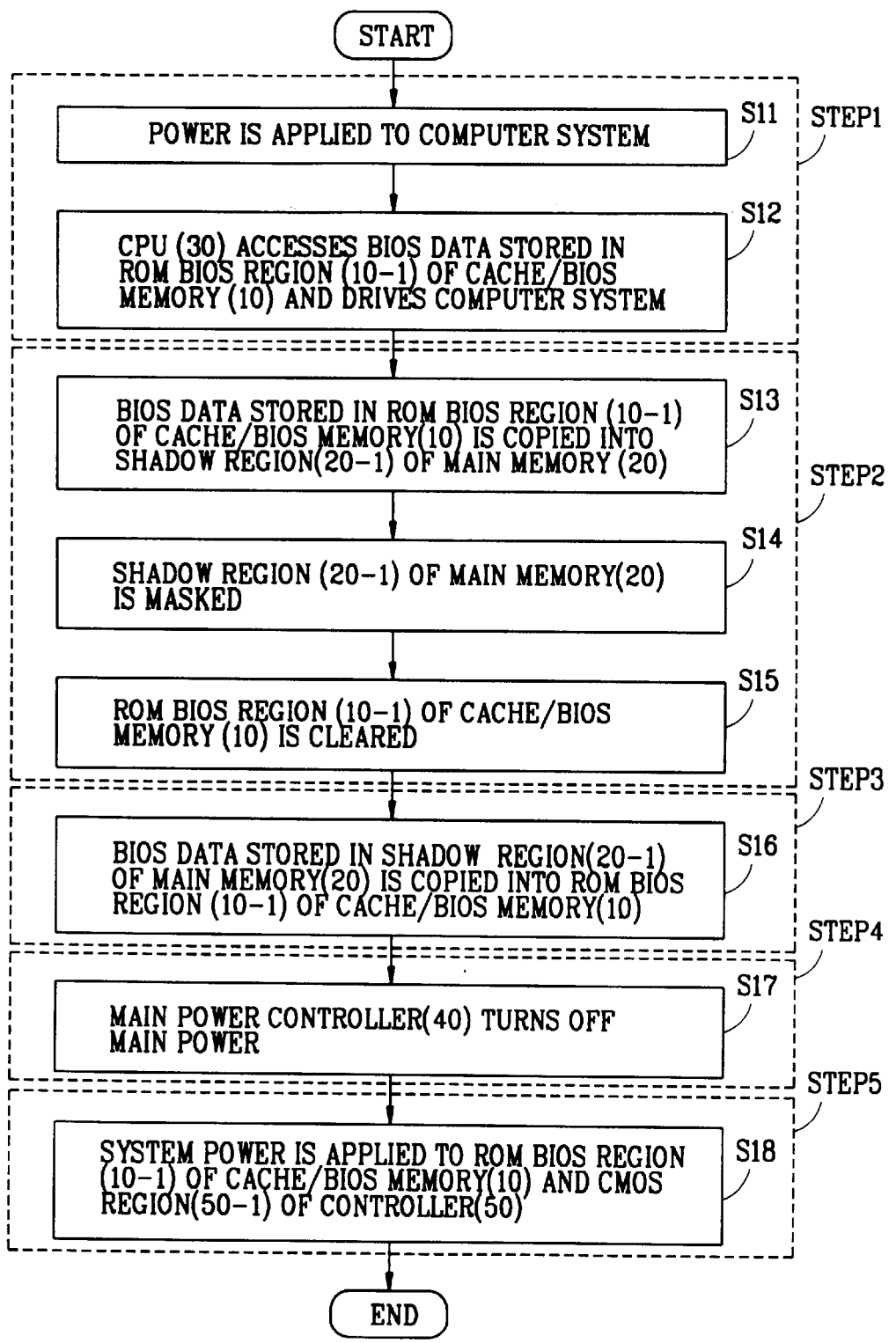
FIG. 4 is a flow chart of the present invention.

The operation of the BIOS data storing apparatus for a computer system according to the present invention will be explained with reference to FIG. 4.

First, when an electric power is supplied to the computer system in S11, the CPU 30 accesses the BIOS data stored in the ROM BIOS region 10-1 of the cache/BIOS memory 10 and drives the computer system in S12.

The BIOS data stored in the ROM BIOS region 10-1 of the cache/BIOS memory 10 is copied into the shadow region 20-1 of the main memory 20 in S13, and the controller 50 masks the shadow region 20-1 of the main memory 20 for implementing only a read operation by preventing the write operation for protecting the BIOS data copied into the shadow region 20-1 of the main memory 20 in S14. In addition, the controller 50 clears the ROM BIOS region 10-1 of the cache/BIOS memory 10 for using the entire spaces of the cache/BIOS memory 10 for the cache memory in S15.

Thereafter, when using the BIOS data, the CPU 30 accesses the BIOS data stored in the shadow region 20-1 of the main memory 20 for thereby performing a corresponding program.

If a user wishes to turn off the electric power supplied to the computer system, the main power controller 40 outputs a first recognition signal CON1 indicating that an instruction is inputted to turn off the power to the controller 50 in accordance with a power off instruction signal OFF, and the controller 50 copies the BIOS data stored in the shadow region 20-1 of the main memory 20 into the ROM BIOS region 10-1 of the cache/BIOS memory 10 in accordance with the first recognition signal CON 1 of the main power controller 40 in S16 and outputs a second recognition signal CON2 indicating a data copy completion to the main power controller 40 for thereby turning off the main power by the main power controller 40 in S17.

Here, when the BIOS data stored in the shadow region 20-1 of the main memory 20 is copied into the ROM BIOS region of the cache/BIOS memory 10, a predetermined error may occur, so that the computer system may not be booted up even when the electric power is supplied to the system. In order to prevent the above-described problem, the BIOS data is previously stored into the CMOS region 50-1 of the controller 50 for implementing a basic BIOS function.

At the initial stage, the electric power is supplied from the system power unit 60 to the CMOS region 50-1 of the controller 50 for preventing the loss of the data, and the electric power is supplied to the cache/BIOS memory 10 for thereby continuously maintaining the BIOS data in S18.

The method for driving the BIOS data storing apparatus for a computer system according to the present invention will be explained.

In a first step STEP1, when an electric power is supplied to the computer system, the CPU 30 accesses the BIOS data stored in the cache/BIOS memory 10 and drives the computer system.

In a second step STEP2, the BIOS data stored in the ROM BIOS region 10-1 of the cache/BIOS memory 10 are copied into the shadow region 20-1 of the main memory 20, and the shadow region 20-1 of the main memory 20 is masked, and the ROM BIOS region 10-1 of the cache/BIOS memory 10 is cleared.

In a third step STEP3, when an instruction for stopping the supply of the electric power to the computer system is inputted, the main power controller 40 outputs a first recognition signal CON1 to the controller 50, and the BIOS data stored in the shadow region 20-1 of the main memory 20 are copied into the ROM BIOS region 10-1 of the cache/BIOS memory 10.

In a fourth step STEP4, a second recognition signal CON2 indicating that the operation for copying the BIOS data stored in the shadow region 20-1 of the main memory 20 into the ROM BIOS region 10-1 of the cache/BIOS memory 10 is completed is outputted to the main power controller 40 for thereby stopping the power supplying operation of the main power controller 40.

In a fifth step STEP5, when the main power controller 40 turns off the main power, the system power unit 60 supplies the system power to the ROM BIOS region 10-1 of the cache/BIOS memory 10 and the CMOS region 50-1 of the controller 50 for preventing the loss of the data stored.

As described above, in the BIOS data storing apparatus and method for a computer system according to the present invention, since the BIOS data are stored into a predetermined region of the SDRAM used as a cache memory, an expensive ROM is not used in the present invention thus resulting in savings in the fabrication cost of the system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A BIOS (Basic Input/Output System) data storing apparatus for a computer system, comprising:

a cache memory for performing a high speed reading/ writing operation of stored data, and for storing a BIOS data therein while the computer system is turned off;

a main memory for storing the BIOS data stored in the cache memory in order that the CPU accesses the BIOS data while the computer system is turned on;

a main power unit controlling the supplying or blocking of main power to the computer system;

a controller for controlling copying of the BIOS data stored in the cache memory into the main memory when the computer system is first turned on; and a system power unit for supplying system power to the cache memory and the controller regardless of the supplying of main power to the computer system.

2. The apparatus of claim 1, wherein said cache memory is formed of a SRAM (Static Random Access Memory).

3. The apparatus of claim 1, wherein said main memory is formed of a DRAM (Dynamic Random Access Memory).

4. The apparatus of claim 1, wherein said main memory includes a predetermined region for storing the BIOS data therein.

5. The apparatus of claim 1, wherein said controller outputs a second recognition signal to the main power unit in response to the first recognition signal to indicate that the BIOS data has been stored back into the cache memory.

6. The apparatus of claim 1, wherein said system power unit supplies power to a predetermined region of the controller.

7. The apparatus of claim 1, wherein said controller clears a predetermined region of the cache memory for enabling using an entire space of the cache memory.

8. The apparatus of claim 1, wherein said controller copies the BIOS data stored in the main memory into a predetermined region of the cache memory in response to a first recognition signal.

9. The apparatus of claim 1, wherein said cache memory includes a predetermined region for storing the BIOS data therein.

10. The apparatus of claim 9, wherein said controller clears the predetermined region of the cache memory for enabling the entire cache memory to be used.

11. The apparatus of claim 1, wherein said main power unit outputs a first recognition signal to the controller indicating that the main power is about to be turned off.

12. The apparatus of claim 11, wherein said controller outputs a second recognition signal to the main power unit in response to the first recognition signal to indicate that the BIOS data has been stored back into the cache memory.

13. The apparatus of claim 1, wherein said controller includes a predetermined region for storing the BIOS data therein for performing a basic BIOS function.

14. The apparatus of claim 13, wherein said predetermined region of the controller is formed of a CMOS.

15. The method of claim 10, wherein said fourth step is controlled by a second recognition signal outputted from the controller.

16. The method of claim 15, wherein said second recognition signal is generated when the third step is completed.

17. The method of claim 10, wherein said third step includes a step for storing a basic BIOS function into a predetermined region of the controller.

18. In a BIOS storing apparatus for a computer system which includes a cache memory for performing a high speed reading/writing operation of stored data and for storing the BIOS data therein while the computer system is turned off, a main memory for storing a copy of the BIOS data stored in the cache memory in order that a CPU (Central Processing Unit) can access the BIOS data while the computer system is turned on, a main power unit controlling the supplying or blocking of main power to the computer system, a controller for controlling the copying of the BIOS data stored in the cache memory into the main memory, and a system power unit for supplying a system power to the cache memory and a predetermined region of the controller regardless of the supplying of the main power to the computer system, a method for storing the BIOS data for the computer system, comprising:

a first step in which the CPU accesses the BIOS data stored in a predetermined region of the cache memory when the main power is first supplied to the computer system;

a second step in which the BIOS data stored in the predetermined region of the cache memory is copied into a predetermined region of the main memory in order that the CPU may access the BIOS data while the computer system is turned on;

a third step in which the BIOS data stored in the predetermined region of the main memory is recopied into the predetermined region of the cache memory prior to turning off the computer system;

a fourth step in which the main power unit turns off the main power to the computer system; and a fifth step in which the system power unit supplies a system power to a predetermined region of the cache memory and the predetermined region of the controller.

19. The method of claim 18, wherein in said second step, a predetermined region of the cache memory is cleared after the BIOS data has been copied into the predetermined region of the main memory.

20. The method of claim 18, wherein said third step further includes a step for storing a basic BIOS function into a predetermined region of the controller.

21. The method of claim 18, wherein said third step is controlled by a first recognition signal outputted from the main power unit.

22. The method of claim 21, wherein said first recognition signal is generated when the main power is about to be turned off.

23. The method of claim 18, wherein said fourth step is controlled by a second recognition signal outputted from the controller.

24. The method of claim 23, wherein said second recognition signal is generated when the third step is completed.

25. A BIOS (Basic Input/Output System) data storage management method for a computer system, comprising:

a first step in which a CPU of the computer system accesses BIOS data stored in a predetermined region of a cache memory of the computer system when main power is supplied to the computer system;

a second step in which the BIOS data stored in the predetermined region of the cache memory is copied into a predetermined region of a main memory of the computer system in order that the CPU may access the BIOS data;

a third step in which a controller of the computer system clears the BIOS data stored in a predetermined region of the cache memory in order that the CPU may use all portions of the cache memory;

a fifth step in which a main power unit of the computer system turns off the main power of the computer system; and a sixth step in which a system power unit of the computer system supplies system power to the predetermined region of the cache memory and the predetermined region of the controller.

26. The method of claim 25, wherein said system power is supplied to a predetermined region of the controller.

27. The method of claim 25, wherein said fourth step includes a sub-step for storing a basic BIOS function into a predetermined region of the controller.

28. The method of claim 25, wherein said fourth step is controlled by a first recognition signal.

29. The method of claim 25, wherein said first recognition signal is generated when the main power is about to be turned off.

30. The method of claim 25, wherein said fifth step is controlled by a second recognition signal.

31. The method of claim 30, wherein said second recognition signal is generated when the fourth step is completed.

32. A method for processing BIOS (basic input output system) data in a computer system, comprising:

accessing BIOS data initially stored in a first memory other than a read-only memory (ROM) type device;

booting the computer system based on the accessed BIOS data;

storing a copy of the BIOS data into a second memory;

masking a portion of the second memory having the copied BIOS data stored therein;

clearing the first memory of the BIOS data stored therein; and further accessing the BIOS data from the second memory, if needed during computer system operation.

33. The method of claim 32, further comprising:

receiving a control signal to turn off the computer system;

storing a copy of the BIOS data into the first memory prior to turning off the computer system in accordance with the control signal; and maintaining the BIOS data in the first memory after turning off the computer system.

34. The method of claim 33, further comprising a step of storing a copy of the BIOS data into a memory device other than the first and second memories prior to turning off the computer system in accordance with the control signal.

* * * * *